United States Patent Office 3,776,962
Patented Dec. 4, 1973

3,776,962
PROCESS FOR THE MANUFACTURE OF
AROMATIC SUBSTITUTED ALKANES
Husni R. Alul and Gilbert J. McEwan, St. Louis, Mo.,
assignors to Monsanto Company, St. Louis, Mo.
No Drawing. Filed May 26, 1966, Ser. No. 553,030
Int. Cl. C07c 39/06
U.S. Cl. 260—624 C
10 Claims

ABSTRACT OF THE DISCLOSURE

Alkyl aromatic products containing higher percentages of compounds in which the aromatic substituent occupies the 2 or 3 position on the alkyl chain are prepared by reaction of olefins and aromatics in the presence of an amount of hydrogen fluoride catalyst insufficient to form a separate catalyst phase. The sulfonates of such products have high solubility and are useful as surfactants in detergent formulations.

---

This invention relates to methods for the production of arylalkanes and alkylphenols and more specifically, the invention relates to methods for controlling the isomer distribution in a product produced by the alkylation of a monocyclic aromatic hydrocarbon or a monocyclic phenol with a straight chain olefin in the presence of a hydrogen fluoride catalyst.

It is known that the sulfonates of aryl substituted or hydroxyaryl substituted long chain alkanes have different properties depending upon the position of the aromatic group on the alkyl chain. For most applications in the surface active field, arylalkanes are desired in which the amount of the 2-arylalkane isomer is relatively low and numerous processes have been reported for obtaining arylalkane products containing minimum amounts of 2-arylalkane isomers. However, for certain applications, for example, when one is more interested in obtaining maximum solubility, a product containing a relatively high percentage of compounds in which the aromatic substituent is in the 2 or 3 position and correspondingly smaller percentages of isomers in which the aromatic substituent is positioned centrally with respect to the alkyl chain are advantageous. When one employs an HF catalyst under usual conditions, a product is produced containing a very low percentage of isomers in which the aromatic group is disposed near the end of the alkyl chain, and a process for producing a product containing increased amounts of isomers in which the aromatic group is attached near one end of an alkyl chain and correspondingly smaller amounts of the isomers in which the aromatic group is attached near the center of the alkyl chain while still permitting one to employ an HF catalyst would be an advance in the art.

It has now been found in accordance with this invention that in the alkylation of monocyclic aromatic hydrocarbons or phenols with long chain normal alkenes using an HF catalyst the proportions of isomers in which the aromatic nucleus is near one end of the alkyl chain can be materially increased under almost all otherwise standard conditions of alklation by using conditions such that one does not obtain a separate catalyst phase. Normally, in using an HF catalyst, process conditions and an amount of catalyst are employed such that a separate catalyst phase is obtained, and the use of a relatively large excess of the HF catalyst has been conventionally considered to be advantageous. However, hydrogen fluoride is soluble to a limited extent in a mixture of aromatic hydrocarbons and alkenes or a mixture of a phenol and alkenes, and in accordance with this invention it has been found that a satisfactory alkylation reaction can be achieved using an amount of HF equal to or below that amount which is soluble at the particular reaction conditions being employed in the particular mixture of raw materials being utilized in the alkylation reaction.

The solubility of hydrogen fluoride in a hydrocarbon mixture or a phenol-hydrocarbon mixture is dependent not only upon the specific composition of the reaction mixture, but also upon temperature so that with any particular reaction mixture, one can greatly increase the amount of HF catalyst which can be employed in accordance with this invention by selecting a reaction temperature which favors the solubility of HF in the reaction mixture. If one employs in accordance with this invention the maximum amount of HF catalyst which can be employed without the separate formation of a separate catalyst phase, one obtains the minimum formation of by-products, and for this reason and for the further reason that the amount of catalyst present has only a relatively small effect upon the isomer distribution in the product as long as one is careful to prevent at any time during the reaction the formation of a separate catalyst phase, the use of an amount of catalyst near the maximum solubility limit is theoretically advantageous. In actual practice, however, it has been found desirable to utilize an amount of catalyst below the maximum upper limit so that there is no need for precise control of other process variables to avoid the formation of a separate catalyst phase.

The maximum amount of catalyst which can be satisfactorily employed in accordance with this invention can be determined by a solubility test of HF in the aromatic raw material at the temperature to be employed, but an even better method has been discovered for determining the approximate maximum amount of HF which can be employed in most instances. In accordance with this preferred method, an excess of HF is added to a quantity of the aromatic reactant to be employed and the mixture is heated or cooled as needed in a closed vessel to the temperature at which it is desired to conduct the alkylation reaction. The equilibrium pressure generated at this temperature is characteristic of the particular mixture and, if the temperature is below the boiling point of the aromatic reactant, will remain substantially the same as long as any undissolved HF is present. If, therefore, one vents HF from the vessel until a substantial pressure drop is obtained, one is certain that there is no longer any separate HF phase in the mixture. Of course, the solubility of HF in the alkylation product is also a consideration but one that need not ordinarily be taken into amount because of the large excess of aromatic reactant usually employed. In the production of most arylalkanes and alkylphenols useful as detergent intermediates, the maximum solubility of HF in the starting reaction mixture is in the vicinity of about 8% to 14% by weight.

As mentioned above, if one attempts to employ too little catalyst in the process of this invention, one is likely to obtain undesirable side reactions. For this reason, it is seldom if ever advantageous to employ less than about 0.2% by weight of HF catalyst based upon the total weight of the reaction mixture and in most instances it is desirable to employ at least about 1% by weight of HF catalyst. The optimum amount of catalyst to be employed in accordance with his invention is generally from about 2% to 6% by weight based on the over-all weight of the reaction mixture.

Except as set forth above, the process of this invention can be conventional and can be employed in the production of substantially any arylalkane or alkylphenol product which has been conventionally employed in the manufacture of detergent surface active agents. The aromatic hydrocarbon most frequently employed in the manufacture of detergent intermediates is benzene, and the phenolic compound most frequently employed is phenol.

However, other monocyclic aromatic hydrocarbons and phenols can suitably be employed in the process, and suitable examples include resorcinol, ortho-cresol, toluene, xylene, and cumene. Any aliphatic hydrocarbon substituent group or groups on the aromatic nucleus should in each instance be saturated to prevent side reactions and the total number of substituents, including hydroxy groups, on the aromatic nucleus preferably should not be more than 2 or 3 in number. In most instances, the aromatic reactant will contain not more than about 9 carbon atoms, although this limitation is dictated by availability and desirability for use in the manufacture of detergent intermediates, and if desired, the invention can be used with aromatic reactants containing 12 or 15 or more carbon atoms.

Normal alkenes which can suitably be employed in the process of this invention include any of those conventionally employed in the manufacture of detergent intermediates. In most instances, the alkenes will have from 8 to 24 carbon atoms and alkenes having a molecular chain length of from 10 to 20 carbon atoms are preferred. Alkenes are usually mixtures rather than substantially pure materials and such mixtures having average molecular chain lengths within the above ranges are quite suitable for use in the process of this invention. The location of the double bond in the alkene has no bearing upon its usefulness in the process but does have an effect upon the isomer distribution of the finished product and if the starting alkene material is composed predominantly of alpha olefins, the resulting product may contain as much as about 40% of the isomer in which the aromatic substituent is in the 2 position. At the other extreme, if the starting material is composed predominantly of internal olefins, such as dodecene-6, and various expedients are used favoring the production of low 2-arylalkane or 2-hydroxyarylalkane content material, the percent of such material in the product can be made to be as low as about 10%. Starting with either alpha-olefins or internally unsaturated olefins, however, one obtains in accordance with this invention a product containing a higher percentage of isomers in which the aromatic substituent is in the 2 position than would be obtained starting with the same raw materials and using conventional HF catalyzed alkylation techniques. If the starting alkene material is a mixture of alpha-olefins and internal olefins, the 2-arylalkane or 2-hydroxyarylalkane content of the product will be between that which would be obtained under similar conditions using substantially pure alpha-olefins and substantially pure olefins in which the double bond is centrally disposed in the aliphatic chain.

As in conventional practice, it is usually advantageous in accordance with this invention to employ an aromatic to olefin molar ratio of at least about 1:1 because the use of a lower ratio results in excessive formation of high boiling by-products. There is no upper limit as to the aromatic to olefin molar ratio except that dictated by convenience and the economics of recovering unreacted raw materials. An aromatic to olefin molar ratio as high as 100:1 can suitably be employed, but the preferred aromatic to olefin ratio is generally from 1½:1 to 10:1. Varying the aromatic to olefin ratio in most instances has no marked effect upon the 2-arylalkane or 2-hydroxyarylalkane content of the product but does affect in a conventional manner the nature and amount of by-products produced.

The temperature at which the reaction is conducted in accordance with this invention must be correlated with the amount of catalyst present in the reaction mixture to avoid the formation of a liquid hydrogen fluoride phase at least until a substantial part of the reaction has occurred and, of course, if one of the reactants has a boiling point below the reaction temperature selected, sufficient pressure should be employed to avoid reactant loss. Within the limits dictated by these considerations, any suitable reaction temperature and pressure can be employed, and for example, the alkylation temperature can be varied from the freezing point of the reaction mixture to about 200° C. with the preferred operating temperature range being from about 10° C. to 80° C. A change in operating temperature in most instances results in only a slight change in the proportion of 2-arylalkane or 2-hydroxyarylalkane isomer in the product as long as it does not result in the formation of a separate catalyst phase, but temperature does have an important bearing upon alkylation rate and, in some instances, the nature of by-products produced. Similarly, the pressure can be varied within any suitable range as long as it does not result in vaporization of the raw materials or excessive catalyst loss, and suitable operating pressures can vary from about 0.5 to 10 atmospheres with the preferred pressure range being from about 1 to 4 atmospheres. For reasons previously explained, it is expedient in most instances to use a pressure slightly below the equilibrium pressure of a mixture of the aromatic reactant and HF at the temperature at which it is desired to conduct the reaction. The equilibrium pressure for any reactant at any temperature can be readily determined by any skilled technician following the procedure previously described and illustrated in the examples. As guides, the equilibrium pressures for a mixture of benzene and HF at various temperatures are as follows: 30° C.—10 p.s.i.g.; 35° C.—13.5 p.s.i.g.; 40° C.—17.5 p.s.i.g.; 45° C.—24.5 p.s.i.g.; 50° C.—30 p.s.i.g.; and 55° C.—39 p.s.i.g.

The avoidance of a separate liquid catalyst phase is only necessary during a portion of the reaction if one does not desire to obtain the maximum possible 2-arylalkane or 2-hydroxyarylalkane isomer content in the product and, for example, one can avoid a separate liquid catalyst phase only until 10% to 25% of the alkene reactant initially present in the reaction mixture has been consumed by chemical reaction and thereby obtain 10% to 25% of the maximum increase in 2-arylalkane or 2-hydroxyarylalkane content which is possible in accordance with this invention. In most instances, however, it will be desired to obtain the maximum benefit from the invention and to maintain the reaction mixture substantially free of a liquid catalyst phase until the reaction is substantially complete or in other words, until at least about 90% of the alkene reactant initially present in the reaction mixture has been consumed by chemical reaction.

Any suitable manipulative procedure can be employed in conducting the process of this invention, but in most instances, it is desirable to form a mixture containing excess HF catalyst and at least a portion, for example, from about 10% to 100%, of the aromatic reactant, and to heat or cool this mixture while confined in a closed reaction vessel to the desired reaction temperature before any of the alkene reactant is added. The mixture is then vented to release excess HF and the pressure in the reaction vessel is lowered to slightly below the equilibrium pressure of a mixture of HF and the aromatic compound at the temperature selected to insure the absence of a liquid HF phase. The exact pressure is not critical as long as it is below the equilibrium pressure at the temperature to be employed and as long as one does not reduce the pressure to an extent which results in a reduction of the catalyst level below operative limits. Usually a reduction of 1 to 100 p.s.i.g. below equilibrium is satisfactory with a reduction of from 2 to 20 p.s.i.g. being preferred. The remainder of the aromatic reactant, if any, in admixture with the alkene reactant is then added to the preheated (or precooled as the case may be) catalyst-aromatic reactant mixture over a period of time and with agitation so that the temperature of the reaction mixture never falls below the selected reaction temperature and the formation of a separate liquid catalyst phase is thereby avoided. When the reaction has reached the desired degree of completeness (the reaction proceeds at a very rapid rate in most instances and is essentially complete in only a few minutes or less), the temperature can be lowered to thereby result, in most instances, in the formation of a separate liquid catalyst phase since the presence of a liquid catalyst phase following completion of the alkylation reaction has no adverse effect.

The invention will now be illustrated by the following specific examples in which all parts are by weight unless otherwise indicated:

EXAMPLE I (A) A mixture of 200 parts by weight of benzene and 40 parts by weight of anhydrous HF is placed in suitable alkylation apparatus and heated to 55° C. The reactor is then carefully vented to a pressure of 35 pounds per square inch gauge while maintaining the mixture of benzene and HF at a temperature of 55° C. There is then added to the reactor over a period of ten minutes with constant agitation a mixture of 100 parts by weight of dodecene-1 and 100 parts by weight of benzene and the resulting alkylation mixture while being subjected to constant agitation is thereafter retained for an additional ten minutes at 55° C. The reaction mixture is then cooled to 6° C. and allowed to stand for one hour during which time two layers are formed. The upper organic layer is separated by decantation and is distilled to remove unreacted benzene and dissolved HF. The crude reaction product thus purified from benzene and HF is then further distilled and an alkylbenzene fraction is taken off overhead, care being exercised to include in this overhead fraction all the alkylbenzene possible to avoid leaving any of the product in the distillation apparatus with the high boiling still bottoms. Excellent results have been obtained by starting the collection of the alkylbenzene fraction when the refractive index of the material coming off overhead reaches $n_D^{25}=1.4790$ (B.P. 128° C./2 mm.) and terminating the collection of the fraction when the refractive index reaches $n_D^{25}=1.4850$. A sample of this purified product is then analyzed by vapor phase chromatography to determine the isomer distribution.

(B) The procedure of A above is repeated except that in place of 40 parts by weight of HF there are employed 200 parts by weight of HF and in place of a pressure of 35 pounds per square inch gauge, the reactor is maintained under a minimum pressure during heating of 40 pounds per square inch gauge to insure a continuous liquid HF phase. It has been found that at a temperature of 55° C. under the conditions of the above example, it is necessary to maintain a pressure of at least about 40 p.s.i.g. before HF will condense to form a separate liquid phase.

In actual tests of the above procedures, the following results were obtained:

| | Procedure "A" (no liquid HF phase) | Procedure "B" (liquid HF phase) |
|---|---|---|
| Percent: | | |
| 2-phenyldodecane | 34.6 | 25.2 |
| 3-phenyldodecane | 20.7 | 16.9 |
| 4-phenyldodecane | 14.1 | 17.4 |
| 5+6-phenyldodecane | 30.6 | 40.6 |

EXAMPLE II

Example I is repeated except that in both procedures A and B an equal quantity of dodecene-6 is substituted for the dodecene-1 employed in Example I. The results of a test using this modification were as follows:

| | Procedure "A" (no liquid HF phase) | Procedure "B" (liquid HF phase) |
|---|---|---|
| Percent: | | |
| 2-phenyldodecane | 22.0 | 14.8 |
| 3-phenyldodecane | 15.0 | 14.5 |
| 4-phenyldodecane | 15.3 | 16.6 |
| 5+6-phenyldodecane | 47.7 | 54.1 |

EXAMPLE III (A) A mixture of 200 parts by weight of benzene and 30 parts by weight of anhydrous HF is placed in a suitable closed reactor and heated to 55° C. The reactor is then carefully vented to a pressure of 35 p.s.i.g. while maintaining the mixture of benzene and HF at a temperature of 55° C. There is then added to the reactor over a period of ten minutes with constant agitation a mixture of 100 parts by weight of benzene, 25 parts by weight of alpha-dodecene, 25 parts by weight of alpha-tetradecene, 25 parts by weight of alpha-hexadecene, 25 parts by weight of alpha-octadecene, and 100 parts by weight of benzene. The reaction mixture was retained at 55° C. with constant agitation for an additional ten minutes after which the alkylbenzene product was separated from catalyst and unreacted benzene by the procedure of Example I. The thus purified product was then analyzed by vapor phase chromatography to determine the isomer distribution of the various alkyl-benzenes.

(B) The procedure of A above is repeated except that in place of 30 parts by weight of HF there are employed 210 parts by weight of HF and in place of a pressure of 35 p.s.i.g., the reactor is maintained under a minimum pressure during heating of 40 p.s.i.g. to insure a continuous liquid HF phase.

In actual tests of the above procedures, the isomer distribution of the phenyldodecane in the resulting product was approximately the same as reported in Example I and the isomer distribution of the other arylalkanes were as follows:

| | Procedure "A" (no liquid HF phase) | | | Procedure "B" (liquid HF phase) | | |
|---|---|---|---|---|---|---|
| | $C_{14}$ | $C_{16}$ | $C_{18}$ | $C_{14}$ | $C_{16}$ | $C_{18}$ |
| Percent isomer: | | | | | | |
| 2-phenyl | 39.6 | 37.6 | 37.7 | 24.4 | 32.4 | 31.4 |
| 3-phenyl | 17.7 | 19.3 | 17.6 | 15.3 | 12.5 | 14.7 |
| 4-phenyl | 10.8 | 9.8 | 9.1 | 13.3 | 7.3 | 8.4 |
| 5-phenyl | 10.7 | 8.3 | 8.5 | 13.5 | | |
| Rest | 21.2 | 25.0 | 27.1 | 33.5 | 47.8 | 45.5 |

The procedure when employing other aromatic or alkane reactants can be the same as illustrated in the above examples.

What is claimed is:

1. In a process for the manufacture of aromatic substituted alkanes wherein an aromatic compound is reacted in a reaction mixture with a normal alkene of from about 8 to 24 carbon atoms in the presence of hydrogen fluoride catalyst, said aromatic compound being selected from the group consisting of monocyclic aromatics having not more than 15 carbon atoms and in which the aromatic compound has not more than three substituents, the substituents in each instance being selected from the group consisting of hydroxy and alkyl groups, the improvement which comprises increasing the proportion of the product wherein the aromatic compound is substituted on a 2 or 3 position of the alkane, by conducting the reaction at a temperature from the freezing point of the reaction mixture to 200° C. in the absence of any separate liquid catalyst phase until at least about 25% of the alkene in the reaction mixture has been consumed by chemical reaction.

2. A process in accordance with claim 1 wherein the temperature of said reaction mixture is maintained within the range of from about 10° C. to 80° C. until at least about 25% of the alkene reactant initially present in the reaction mixture has been consumed by chemical reaction.

3. A process in accordance with claim 2 wherein said reaction is conducted under a pressure of from about 0 to 100 pounds per square inch gauge.

4. A process in accordance with claim 3 wherein the amount of catalyst present in said reaction mixture is from about 2% to 6% by weight based on the over-all weight of reaction mixture.

5. A process in accordance with claim 3 wherein the reaction temperature is maintained within the range of from about 10° C. to 80° C. and the reaction pressure is retained within the range of from about 0 to 100 pounds per square inch gauge until said reaction is essentially completed.

6. A process in accordance with claim 3 wherein said alkene reactant has a molecular chain length of from 10 to 20 carbon atoms.

7. A process in accordance with claim 6 wherein said alkene reactant is composed predominantly of alpha-olefins.

8. A process in accordance with claim 6 wherein said aromatic compound is benzene.

9. A process in accordance with claim 6 wherein said aromatic compound is phenol.

10. A process in accordance with claim 3 wherein a mixture is formed of at least a portion of said aromatic compound and excess HF catalyst, the resulting mixture brought while confined to an initially selected temperature within the range of about 10° C. to 80° C., the pressure on said mixture reduced to below the equilibrium pressure of a mixture of said aromatic compound and liquid HF, and said alkene and remaining aromatic compound, if any, is then added while retaining said reaction mixture at a temperature at least about as high as said initially selected temperature.

References Cited

UNITED STATES PATENTS

| | | | |
|---|---|---|---|
| 2,275,312 | 3/1942 | Tinker et al. | 260—515 |
| 2,793,239 | 5/1957 | Toland | 260—671 |
| 2,910,522 | 10/1959 | Gerhold et al. | 260—683.48 |
| 2,871,254 | 1/1959 | Hoog et al. | 260—460 |
| 3,275,702 | 9/1966 | Hutson | 260—671 |
| 3,349,144 | 10/1967 | Alul et al. | 260—671 |

BERNARD HELFIN, Primary Examiner

W. B. LONE, Assistant Examiner

U.S. Cl. X.R.

260—671, 625